April 2, 1968
E. L. PARR
3,375,557
ANCHOR FOR A CHAIN
Filed May 27, 1966
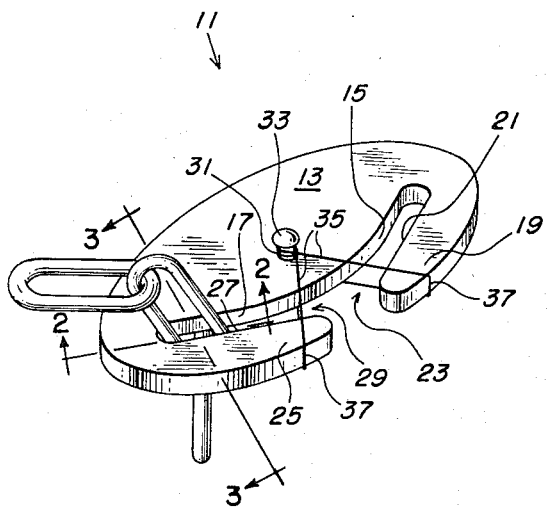
FIG. 1
FIG. 2
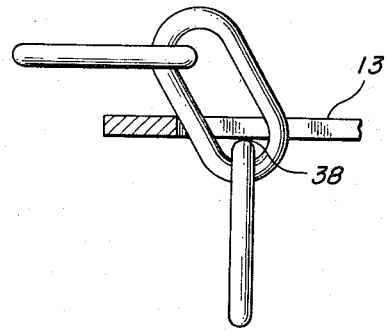
FIG. 3
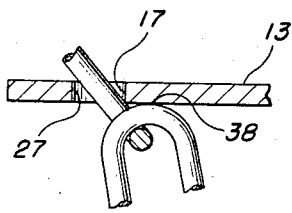
INVENTOR.
EDWARD L. PARR
BY
Tylwider Patton, Reiher,
Lee & Utecht   attorneys

United States Patent Office 3,375,557
Patented Apr. 2, 1968

3,375,557
ANCHOR FOR A CHAIN
Edward L. Parr, 301 N. Cuyamaca,
El Cajon, Calif. 92020
Filed May 27, 1966, Ser. No. 553,514
4 Claims. (Cl. 24—116)

ABSTRACT OF THE DISCLOSURE

Fastener for links of a chain including a main body forming a thrust plate for the links, one edge of the body having surfaces disposed at approximately 120 degrees with respect to one another and angling toward the opposite edge of the body, the fastener also including integrally formed retainers lying parallelly with respect to the aforementioned surfaces.

---

The present invention relates to a link fastener that is adapted to fasten links of a chain together and more specifically to a link fastener of the type that includes obliquity disposed slots for accepting and retaining the links of the chain.

The link fastener of this invention, comprises a body that forms a thrust plate for links of chains. One edge of the plate includes a surface extending outwardly in one direction from the central portion of the body and a second surface extending oppositely of said one direction and angled obtusely with respect to the first mentioned surface, both of said surfaces extending toward the opposite edge of the body.

The fastener also includes a link retainer supported from the body at the outer end of the first mentioned surface, and extending along said surface. To form therewith a slot that is wider than the thickness of the material forming the links of the chain to be fastened and narrower than the width of the links.

A second link retainer is supported from the body at the outer end of the second mentioned surface and extends along said surface. To form therewith a slot that is wider than the thickness of the material forming the links to be retained and narrower than the width of the links.

Other features and the advantages of the present invention will be apparent from the following description, reference being had to the accompanying drawing wherein a preferred embodiment of the invention is illustrated.

In the drawing:

FIG. 1 is a perspective view of the link fastener of the present invention and also showing a fragment of a link type chain;

FIG. 2 is a view, partly in section, of the link fastener shown in FIG. 1, the view being taken along the line 2—2 of FIG. 1 and also showing a fragment of a link type chain; and FIG. 3 is a sectional view partly in section of the link fastener shown in FIG. 1, the view being taken along the lines 3—3 of FIG. 1.

Referring more in detail to the drawing, the fastener 11 includes a body 13. One side, herein shown as the underside of the body 13 provides a thrust bearing surface for links of a chain or chains and one edge thereof includes an elongated surface 15 that extends outwardly from the central portion of the body. The said edge includes a second surface 17 extends outwardly in the opposite direction of the surface 15 and this surface forms an angle of 120 degrees with the surface 15.

A retainer 19 is formed integrally with the body 13 at the outer end of the surface 15 and this retainer extends along the surface 15. The retainer 19 includes a surface 21 that confronts the surface 15 and which extends parallelly therealong to form therewith a slot 23 for accepting the thickness of the material forming a chain link.

A second retainer 25 is formed integrally with the body 13 at the outer end of the surface 17 and this retainer extends along the surface 17. The retainer 25 also includes a surface 27 that confronts the surface 17 and which extends parallelly therealong to form therewith a slot 29. The slot 29 is likewise adapted to accept the thickness of the material forming a chain link. The open ends of slots 23 and 29 are common.

A formed coil spring 31 is mounted on the body 13 by a pin 33. The spring 31 forms coils on both sides of the body 13 and these coils are adapted to surround the pin 33. The spring 31 includes resilient arms 35 that extend adjacent the sides of the body 13 and the respective sides of the respective retainers 19 and 25. The arms 35 extending adjacent opposite sides of the retainers 19 and 25 are connected at their outer end by a portion 37. The coil 31, arm 35, and connecting portion 37 are formed integrally from one piece of spring wire. The arms 35 are biased toward the outer end of the respective slots 23 and 29 and the rotation of the outer ends of the arms 35 is limited by the portions 37.

From the foregoing it will be apparent that when it is desirable to fasten the ends of a chain together, a link near one end of the chain will be moved into the slot 23. This is accomplished by moving the link along the retainer 19 and against the portion 37 of spring 31, thus rotating the arms 35 inwardly so as to permit the link to be moved between the inner end of the retainer 19 and the arms 35. After the link has been moved into the slot 23, the arms 35 assume their biased position to retain the link in the slot. The other end of the chain is fastened in the slot 29 in a similar manner.

As the fastening chain is put in tension, the links extending through the slots 23 and 29 are urged against the crotch forming the outer ends of the slots. As tension increases, the adjoining links in the free ends of the chain are urged against the body 13 as at 38. Thus, the tension in the fastening chain is resisted by the entire material joining the retainers 19 and 25 to the body 13 at the end of the slots 23 and 29, respectively. Since the forces in the chain ends are acting parallel and in opposite directions, turning of the links extending through the slots 23 and 29 around the ends of those slots is resisted entirely by the body 13 as at 38. Consequently, the body 13, which is of relatively rigid construction, serves to resist pivoting of the link extending through the slots 23 and 25 and there is essentially no force exerted on the retainers 19 and 25. Thus, the widths of retainers 19 and 25 can be and are relatively narrow with respect to the width of body 13.

From the above it will be apparent that the link fastener 11 of this invention provides a convenient, effective and relatively inexpensive means for fastening links of a chain together.

While the form of embodiment herein shown and described constitutes a preferred form, it is understood that other forms may be adapted falling within the scope of claims that follow.

I claim:

1. A link fastener for fastening links of a chain together, which fastener comprises in combination:
   (A) A body forming a thrust plate for links of chains, said body having:
      (1) an edge;
      (2) an opposite edge, said opposite edge including:
         (a) two joined surfaces, said latter surfaces being disposed at an obtuse angle with respect to one another and extending toward the first mentioned side;

(B) a retainer formed integrally with the body at one of the outer ends of one of the two surfaces of said opposite side and extending parallelly along said one surface, which retainer includes:
(1) a surface that confronts the said one surface and which extends parallelly therealong said one surface to form therewith a slot that is wider than the thickness of the material forming the link of the chain to be fastened and narrower than the width of the link;
(C) a second retainer formed integrally with the opposite end of the body at the outer end of the other of the two surfaces of said opposite side and extending along said surface, which retainer includes:
(1) a surface that confronts the said other surface and which extends parallelly therealong said other surface to form therewith a slot that is wider than the thickness of the material forming the link to be retained and narrower than the width of the link, the width of the retainers being relatively narrow with respect to the width of the body and the open ends of said slots being in common; the obtuse angle between the body surfaces (A) (1) (a) being approximately 120 degrees whereby the material of the body forming said surfaces (A) (1) is subjected to substantially all forces applied to the fasteners by the links of the chains.

2. A link fastener as defined in claim 1, characterized to include (D) means for retaining the links in the slots formed by said body (A) and said retainers (B) and (C), said means (D) including:
(1) a movable arm supported from said body (A), disposed from the supported end of said retainer (B) and extending adjacent one side of said body (A) and adjacent the same side of said retainer (B);
(2) means for biasing the arm toward the supported end of said retainer (B);
(3) a second movable arm supported from said body (A) and disposed from the supported end of said retainer (C) and extending adjacent one side of said body (A) and adjacent the same side of said retainer (C);
(4) means for biasing the second mentioned movable arm toward the supported end of said retainer (C).

3. A link fastener as defined in claim 2, characterized to include means for limiting the movement of said arms (D) (1) and (3) toward the respective supported ends of the retainers (B) and (C).

4. A link fastener as defined in claim 3, characterized in that the limiting means and said retaining means (D) are formed integrally.

References Cited

UNITED STATES PATENTS

| | | | |
|---|---|---|---|
| 569,448 | 10/1896 | Dudley. | |
| 873,553 | 12/1907 | Johnson | 24—236 |
| 2,540,330 | 2/1951 | Gries | 24—236 |
| 3,027,615 | 4/1962 | Forney | 24—116 |

FOREIGN PATENTS

| | | |
|---|---|---|
| 702,094 | 1/1965 | Canada. |
| 1,103,725 | 10/1965 | France. |
| 383,799 | 1/1965 | Switzerland. |

BERNARD A. GELAK, *Primary Examiner.*